3,565,924
Patented Feb. 23, 1971

3,565,924
25-HYDROXYCHOLECALCIFEROL
Hector Floyd De Luca, Madison, Wis., and John Wilson Blunt, Christchurch, South Island, New Zealand, assignors to Wisconsin Alumni Research Foundation, Madison, Wis., a corporation of Wisconsin
No Drawing. Filed July 1, 1968, Ser. No. 741,239
Int. Cl. C07c *171/10*
U.S. Cl. 260—397.2        1 Claim

ABSTRACT OF THE DISCLOSURE 25-hydroxycholecalciferol. The compound is characterized by vitamin-D-like activity and finds application as an animal feed supplement.

SPECIFICATION

This invention relates to a compound characterized by vitamin-D-like activity.

More specificially this invention relates to a derivative of vitamin $D_3$.

The antirachitic activity of vitamin D and more specifically vitamin $D_3$ (cholecalciferol) are well documented. Also, the application of the various D-vitamins as nutritional supplements is well established and well known.

A derivative of vitamin $D_3$ has now been found which is characterized by greater biological activity than vitamin $D_3$. This derivative has been identified as 25-hydroxycholecalciferol and is obtained in accordance with the following precedure.

ISOLATION

Four hogs (210–246 lb.) were maintained on a normal diet supplemented with 250,000 international units (IU) of vitamin $D_3$ (Delsterol brand, Vita Plus Corporation, Madison, Wis.) daily for a period of 26 days. The blood of these hogs was then collected and was treated with 1.6 liters of 0.1 M sodium oxalate to recover 6.8 liters of plasma. The serum proteins were separated by adding sufficient ammonium sulfate to the serum to achieve a 65–70% saturation, the precipitate resulting from such addition was allowed to form for three days at 4° C., was collected by centrifugation for 25 minutes at 15,000 r.p.m. and was extracted with 9 l. methanol-chloroform (ratio 2 to 1) by the method of Blight and Dyer, Canadian J. Biochem. Physiol., 37, 911 (1959). The total extract from this procedure was made up to a volume of 50 ml. with Skelly B [Skellysolve B, straight run aliphatic naphthas (essentially normal hexane) derived from petroleum oil marketed by Skelly Oil Company, and having a boiling range of from about 60° to 68° C.] and assayed for a total of 100,000 IU vitamin D activity by rat line test assay (U.S. Pharmacopeia 1955).

200 ml. of the Skelly B extract from the foregoing procedure was applied to a silicic acid adsorption column for chromatography (58 x 1.5 cm. and containing 25 gms. silicic acid). The column was eluted with an ether-Skelly B gradient obtained by running 400 ml. of 85% ether/Skelly B from a holding chamber into a 250 ml. mixing chamber initially containing 250 ml. Skelly B. Following the collection of thirty-six 11 ml. fractions, 100% ether was placed in the holding chamber and an additional thirty 11 ml. fractions were collected. Fractions 51–60 were combined and applied to a partition column constructed as follows: twenty grams of Celite (a diatomaceous silica product marketed by Johns-Manville Company) was mixed with 15 ml. of a stationary phase (80% methanol-20% water, equilibrated with an equal volume of Skelly B); about two-thirds of this material was packed in a glass column 1 cm. in diameter and the samples (fractions 51–60) were applied to the column in a small quantity of the mobile phase (Skelly B equilibrated with methanol-water) and the column was eluted with the mobile phase with 5 ml. fractions being collected. Fractions numbers 17–21 were accumulated. The remainder of the 50 ml. of Skelly B extract was likewise chromatographed and partitioned in accordance with the foregoing procedure and the same partition fractions were accumulated.

In all cases, and for purposes of reproducibility, the fractions exhibiting an ultraviolet absorption maximum in diethyl ether at 264 m$\mu$ are the fractions to be retained and accumulated. An extinction coefficient of 18,200 was used for the ultraviolet absorption maximum.

IDENTIFICATION

Through ultraviolet spectrophotometry and gas-liquid chromatography it was determined that the isolated material had a structure similar to that of vitamin $D_3$. Subsequent high resolution mass spectra with an Associated Electrical Industries model MS–9 mass spectrometer coupled with a Scientific Data Systems Sigma-7 model computer provided information on the differences between vitamin $D_3$ and the isolate obtained in the above procedure.

The molecular weight of the isolate was found to be 400 (molecular formula $C_{27}H_{44}O_2$, i.e. a cholecalciferdiol). In the mass spectra of the isolate and vitamin $D_3$, the presence of a peak at m./e. 271 ($C_{19}H_{27}O$) indicated the location of the second hydroxyl group of the isolate on the side chain since the fragment m./e. 271 arises by loss of side chain through cleavage of the $C_{17-20}$ bond. In addition, a peak at m./e. 59 ($C_3H_7O$) in the isolate spectrum but not in the spectrum of vitamin $D_3$ could arise by cleavage of the $C_{24-25}$ bond with the hydroxyl group attached to $C_{25}$. The location of the hydroxyl group at $C_{25}$ was verified by the 100 mc./sec. n.m.r. spectrum [recorded in CDCl$_3$ solution in a Varian Associates Model HA–100 spectrophotometer using tetramethylsilane (TMS) as internal standard] which exhibited a strong singlet peak at δ1.20 p.p.m. (as in 25-hydroxycholesterol), an absence of the doublet at δ0.87 p.p.m. due to the secondary $C_{26, 27}$-methyl groups as found in cholecalciferol. Other n.m.r. identification characteristics are identical for vitamin $D_3$ and the isolate as follows:

δ0.58 p.p.m.—peaks due to TMS internal standard
δ0.54 p.p.m.—resonance of $C_{18}$-$H_3$ group
δ0.93 p.p.m.—doublet due to $C_{21}$-$H_3$ group (J=5 c./sec.)
δ4.81, 5.03 p.p.m.—peaks from $C_{19}$-$H_2$ group
δ6.02 p.p.m. (J=11.5 c./sec.), 6.24 p.p.m. (J=10.5 c./sec.)—doublets due to protons at 6- and 7-positions.

BIOLOGICAL ACTIVITY

Line test assay or rickets cure test

Weanling rats were fed the ratchitogenic diet of Steenbock and Black, J. Biol. Chem., 64, 263 (1925), for 21 days. The diet was modified by the addition of water soluble vitamin as described in De Luca et al, J. Nutr., 75, 175 (1961). After the 21 days depletion period a single 4 IU dose of either standard vitamin $D_3$ or the isolate was administered. Seven days later the rats were killed and the line test was performed on sectioned radii and ulnae of individual rats. The biological activity was ascertained as described in U.S. Pharmacopeia, 14th revision. [Mack Publishing Co., Easton, Pa. (1955).]

Routinely, the isolate gave a value of 56–60 IU per μg. whereas the vitamin $D_3$ gave values of only 40 IU per μg.

Calcium transport by everted intestinal sacs

Male weanling rats were maintained in hanging wire cages and fed libitum a purified vitamin D deficient diet as described in De Luca et al., J. Nutr., 75 supra. This diet does not induce rickets in rats but produces a severe vitamin D deficiency in 3–4 weeks characterized by low serum $Ca^{++}$ and reduced growth [Steenbock H. and Herting, D. C., J. Nutr., 57, 449 (1955)].

After being on the above diet for six weeks the rats were given orally a 0.25 μg. dose of vitamin $D_3(D_3)$ or the isolate (25–OH) in cottonseed oil solution. The controls (–D) received the oil vehicle alone. After the times indicated in the following table the rats were killed and calcium transport by everted intestinal sacs was carried out in accordance with the procedures of Zull, J. E. et al., Science, 149, 182 (1965). The following results were obtained. The calcium transport is expressed as a ratio of $^{45}Ca$ (serosal side)/$^{45}Ca$ (mucosal).

TABLE I

| Sample | Hours after administration | Number of animals | Transport ratio |
|---|---|---|---|
| (a) Control (–D) | | 6 | 0.66±0.02 |
| (b) $D_3$ | 12 | 5 | 0.74±0.03 |
| (c) 25–OH | 12 | 6 | 0.89±0.04 |
| (d) $D_3$ | 24 | 4 | 1.16±0.06 |
| (e) 25–OH | 24 | 4 | 1.24±0.07 |

Pab=0.05, Pac=0.001, Pbc=0.02, Pcd=<0.01, ± standard error of the means.

Additional calcium transport data were obtained under the conditions outlined above except that:

(1) The incubation medium had the composition:

125 mM. NaCl
30 mM. Tris-Cl
0.25 mM. $CaI_2 \cdot 2H_2O$
10 mM. fructose made up to pH 7.4 with HCl and with an amount a $Ca^{45}$ solution added to give about $10^5$ c.p.m./ml. of medium;
(2) Oxygen only was bubbled through the medium at 37° C. for 1½ hours; and
(3) The rats were dosed intrajuglarly with 0.25 μg. of $D_3$ or 25–OH each in 0.02 cc. of ethanol.

The controls received ethanol only. The results are shown in Table II below with calcium transport expressed as a ratio of $^{45}Ca$ (serosal)/$^{45}Ca$ (mucosal).

TABLE II

| Hours after administration | Transport ratio | |
|---|---|---|
| | $D_3$ | 25–OH |
| 0 (control) | 1.25±0.05 [1] (12)[2] | |
| 3 | | 1.74[3]±0.12 (4) |
| 4 | 1.01±0.12 (4) | 1.66±0.13 (4) |
| 6 | 1.32±0.10 (4) | 2.6±0.4 (4) |
| 10 | 2.0±0.3 (3) | 2.3±0.6 (4) |

[1] Standard error of the mean.
[2] Number in parentheses indicate number of rats in group.
[3] P<0.01 above control.

It is evident from the foregoing data that the isolate (25-hydroxycholecalciferol) initiates the onset of calcium transport in the intestine more rapidly than does vitamin $D_3$.

Serum calcium response (bone mobilization)

Male weanling rats were fed the vitamin D-deficient diet described in De Luca et al., J. Nutr., 75, supra, for 11–15 days except that the calcium was eliminated from the diet. The rats were then dosed intrajugularly with 2.5 μg. of vitamin $D_3$ or the isolate (25–OH) each in 0.02 cc. of ethanol. The controls received ethanol only. Serum was collected from the animals at the times indicated in the table below and assayed for calcium by the method of Webster, Am. J. Clin. Pathol., 131, 330 (1960). All assays were conducted in duplicate with the results indicated in the following table.

TABLE III

| Hours after administration | Serum Ca (mg. percent) | |
|---|---|---|
| | $D_3$ | 25–OH |
| 0 (control) | 4.0±0.4 [1] (4)[2] | |
| 4 | 3.8±0.1 (2) | 4.4±0.3 (3) |
| 8 | 3.9±0.1 (3) | 5.7±0.2 (4) |
| 12 | 5.0±0.4 (3) | 7.1±0.4 (4) |
| 16 | 6.6±0.4 (4) | 7.2±0.4 (3) |

[1] Standard deviation.
[2] Number in parentheses indicate number of rats in group.

It is evident from the foregoing that the isolate (25–OH) induces bone mobilization (increase in serum calcium) much more quickly than does vitamin $D_3$.

Poultry feed supplement

A chick feeding study was conducted in accordance with the method outlined in "Vitamin D in Poultry Feed Supplement—First Action, Methods of Analysis," A.O.A.C. 784 (1965), tenth edition. The isolate (25–OH) was dispersed in corn oil for use in the study (125 μg. of isolate in 25 gms. oil). The bones of the individual chicks were pooled by groups and the percentage of ash remaining in the moisture- and fat-free bones determined as a single response to each dosage. The potency of the assay preparation (the isolate) was estimated from the graph of the standards. The results obtained are set forth in the table below.

TABLE IV

| | I.C. 100 units [1] per gram | μg. per 100 gms. of ration | Body weight during study | | Percentage of bond ash (Tibia) |
|---|---|---|---|---|---|
| | | | Initial | Final | |
| Reference group: inert oil only | 0 | 0 | 35 | 116 | 28.3 |
| Reference groups: vitamin D added as U.S.P. reference standard | 400 | 0.113 | 35 | 142 | 32.4 |
| | 400 | 0.158 | 35 | 145 | 33.4 |
| | 400 | 0.225 | 35 | 151 | 35.3 |
| | 400 | 0.319 | 35 | 166 | 38.7 |
| | 400 | 0.450 | 35 | 152 | 41.8 |
| Study Groups: isolate in corn oil | | 0.158 | 35 | 140 | 32.2 |
| | | 0.225 | 35 | 151 | 36.3 |
| | | 0.319 | 35 | 162 | 41.2 |

[1] International chick units—equivalecogalcfent to0.025μchol.iferol.

On the basis of the foregoing data each gram of oil diluted-isolate was estimated to contain at least 206 ICU of vitamin $D_3$ activity.

It is clear from the foregoing that the isolate, 25-hydroxycholecalciferol, is, on a weight basis, more effective in curing rickets in rats than the unaltered vitamin $D_3$; that it induces a more rapid onset of intestinal transport of calcium and of bone mobilization; and that it is more effective than vitamin $D_3$ as a supplement in poultry feeds. Its vitamin D-like activity, as amply demonstrated, would suggest its application broadly as a substitute for vitamin D.

Having thus described the invention what is claimed is:
1. 25-hydroxycholecalciferol.

References Cited

UNITED STATES PATENTS

| | | | |
|---|---|---|---|
| 2,997,486 | 8/1961 | Milas | 260—397.2 |
| 3,157,678 | 11/1964 | Rappoldt | 260—397.2 |

ELBERT L. ROBERTS, Primary Examiner

U.S. Cl. X.R.

195—51

UNITED STATES PATENT OFFICE
CERTIFICATE OF CORRECTION

Patent No. 3,565,924　　　　　　　Dated February 23, 1971

Inventor(s) Hector Floyd DeLuca and John Wilson Blunt

It is certified that error appears in the above-identified patent and that said Letters Patent are hereby corrected as shown below:

The following paragraph should be read as the first full paragraph of the Specification:

"The invention described herein was made in the course of, or under, a grant from the U.S. Public Health Service, Departmen of Health, Education, and Welfare."

Column 1, line 38, "(210-246 lb.)" should read --(210-240 lb.)--; line 5 "Blight" should read --Bligh--; line 59, "200 ml" should read --20 ml--. Column 3, line 3, "ratchitogenic" should read --rachitogenic--; line 49 et seq. In the formulation for the incubation medium "$Cal_2$" should read --$CaCl_2$--.
Table IV. Delete 100 from the heading of the first column; In the headii of the last column "bond" should read --bone--; In the footnote "equiva-[ceogalcfent to0.025μchol.iferol" should read --equivalent to 0.025 μg. o cholecalciferol--.

Signed and sealed this 6th day of July 1971.

(SEAL)
Attest:

EDWARD M. FLETCHER, JR.　　　　WILLIAM E. SCHUYLER, JR.
Attesting Officer　　　　　　　　Commissioner of Patents